United States Patent [19]

Nilsson

[11] Patent Number: 4,559,843
[45] Date of Patent: Dec. 24, 1985

[54] COUPLING MEMBER FOR MECHANISM FOR CONVERTING LINEAR TO ROTARY MOTION

[75] Inventor: Sven W. Nilsson, Partille, Sweden

[73] Assignee: SKF Nova AB, Gothenburg, Sweden

[21] Appl. No.: 419,825

[22] Filed: Sep. 20, 1982

[30] Foreign Application Priority Data

Nov. 6, 1981 [SE] Sweden ............................. 8106580

[51] Int. Cl.⁴ ...................... F16H 19/04; F16H 55/12
[52] U.S. Cl. .......................................... 74/451; 74/30; 251/250; 277/177; 403/3; 403/365
[58] Field of Search ................ 74/30, 451, 424.8 VA, 74/104; 403/3, 4, 365; 411/300; 251/250; 277/177, 168

[56] References Cited

U.S. PATENT DOCUMENTS

| | | |
|---|---|---|
| 705,129 | 7/1902 | Penn ................................. 403/344 X |
| 859,814 | 7/1907 | Hughes ............................ 411/300 X |
| 990,106 | 4/1911 | Cassady ............................... 411/300 |
| 1,983,845 | 12/1934 | Evinburgh . |
| 2,317,529 | 4/1943 | Hodgson et al. ........... 74/424.8 VA |
| 2,421,655 | 6/1947 | Seyfurth et al. . |
| 2,507,093 | 5/1950 | Collings ................................. 403/3 |
| 2,553,222 | 5/1951 | Wallgren et al. ............... 277/168 X |
| 2,724,978 | 11/1955 | Morrell .................. 74/924.8 VA X |
| 2,854,209 | 9/1958 | Erwin .............................. 251/250 X |
| 3,042,431 | 7/1962 | Kryzer ............................ 277/177 X |
| 3,044,787 | 7/1962 | Derman ......................... 277/177 X |
| 3,216,278 | 11/1965 | Plume ..................... 74/424.8 VA X |
| 3,254,691 | 6/1966 | Johnson ............................. 411/300 |
| 3,306,123 | 2/1967 | Norbut et al. .............. 74/424.8 VA |
| 3,473,397 | 10/1969 | Fry ............................. 74/424.8 VA |
| 3,929,024 | 12/1975 | Sheesley et al. ...................... 74/104 |
| 3,949,626 | 4/1976 | Berlinger, Jr. et al. .... 74/424.8 VA X |
| 4,202,526 | 5/1980 | Müller et al. .................... 277/168 X |
| 4,343,564 | 8/1982 | Francis ............................ 403/365 X |
| 4,433,588 | 2/1984 | Watanabe et al. ................ 74/440 X |

Primary Examiner—Rodney H. Bonck
Attorney, Agent, or Firm—Eugene E. Renz, Jr.

[57] ABSTRACT

The invention relates to a device for performing rotational movement and comprises a rotatably element such as a cog-sector (3) or the like, arranged in a housing (1). The sector can easily be connected to rotatable machine elements of various kinds by being provided with an easily exchangeable coupling element (7) which can be displaced axially through a bore in the sector and through two bearings (8, 9) and be detachably fastened to the cog-sector by e.g. screws (14, 15) provided in threaded bores in the sector and abutting radially directed support surfaces in recesses in the element (7) between the bearing surfaces of the bearings (8, 9).

2 Claims, 3 Drawing Figures

U.S. Patent   Dec. 24, 1985   4,559,843
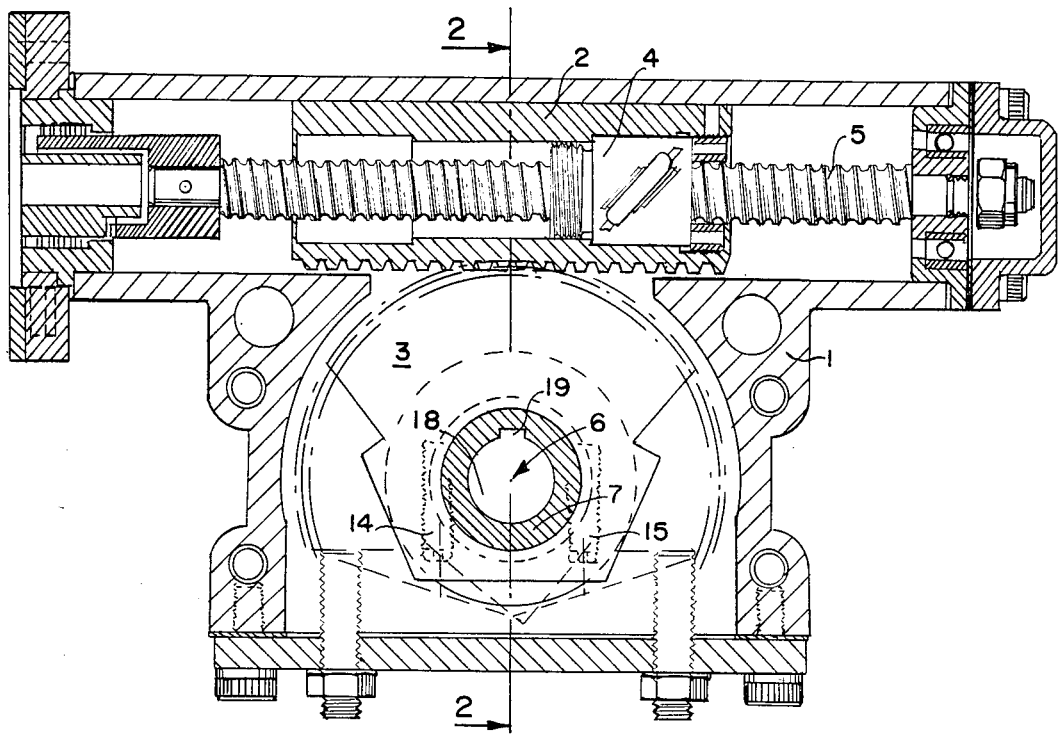
FIG. 1
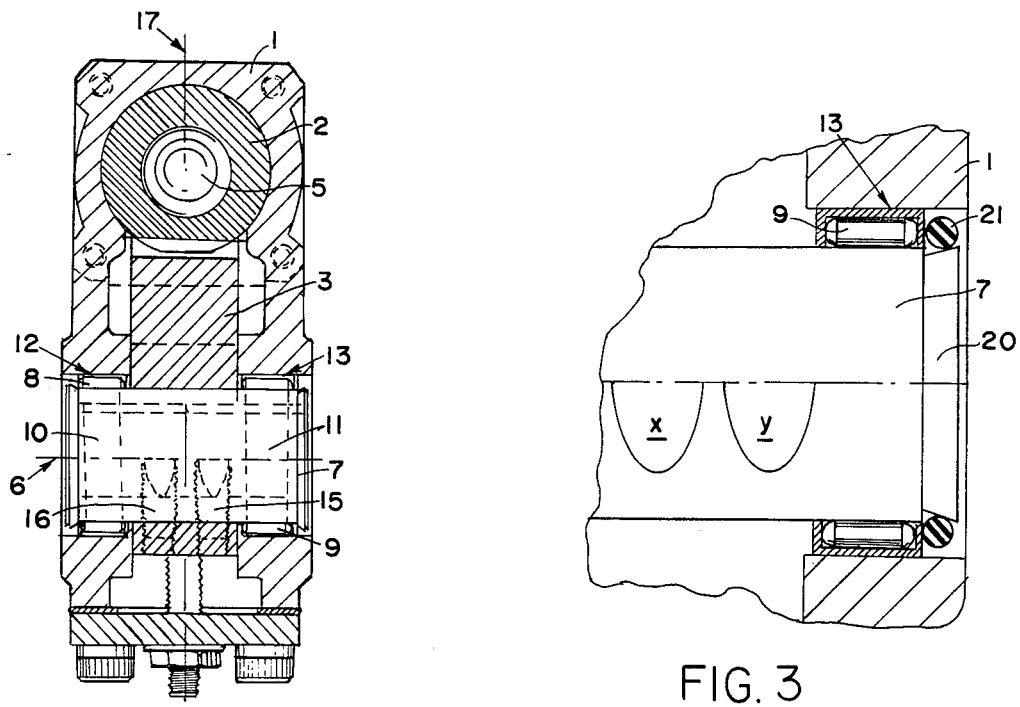
FIG. 2
FIG. 3

COUPLING MEMBER FOR MECHANISM FOR CONVERTING LINEAR TO ROTARY MOTION

The invention relates to a device of the kind described in the introduction of the appended claim 1. Such devices are used in various applications, such as valve controls, in which the size of the opening of the valve is a function of the turning angle of a rotatable element, e.g. a cog-sector, and the turning is brought about by a motor which produces a linear motion of a linearly movable element, e.g. a rack co-operating with the cog-sector.

In order to make it possible to adapt such a device for co-operation with various machine elements which are to be rotated, the device is preferably provided with adjustable or replaceable coupling members for torque-transmitting connection of the machine element and the rotatable element.

The object of the present invention is to provide a device as above, which can easily be adapted for connection to various machine elements.

The object is achieved, according to the invention, by giving the device the characterizing features stated in claim 1.

A device according to the invention comprises a coupling element which is easy to produce and adapt for connection to various machine elements, e.g. valves with different connecting means for control members, and to replace. It can easily be designed so that an efficient seal for bearings for the rotatable element in the device is established in a favourable way.

In the following, the invention is described in detail with reference to the accompanying drawing, in which FIG. 1 shows a longitudinal section;

FIG. 2 a section along II—II in FIG. 1 of a device according to one embodiment of the invention; and FIG. 3 shows a detail of a device according to a modified embodiment of the invention.

The device comprises a housing 1 which has a longitudinal bore in which is arranged a linearly movable rack 2. A cog-sector 3 co-operating with the rack is rotatably arranged in a crossing recess in the housing. The motion of the rack can be brought about by a screw-and-nut device, and the figure shows the rack arranged on a nut 4 co-operating with a screw 5 rotatable by a motor, not shown, the non-rotatable nut being displaced along the screw when the screw is rotated, thereby moving the rack 2. The movement of the rack causes rotation of the sector 3 around the axis 6.

An element 7 is arranged in a cylindrical bore through the cog-sector. The element is mounted in the housing 1 in rolling bearings 8, 9, whose rolling bodies roll against a cylindrical portion 10, 11 of the element 7 on either side of the sector 3. These portions thus constitute the inner raceways for the bearings. Their diameter is less than or equal to the diameter of the bore in the cog-sector. The outer raceways 12, 13 are provided in the housing 1. The rolling bodies are preferably so called needle rings, and the element 7 is axially displaceable through these and through the bore of the sector 3.

Means for disconnectably fastening the sector 3 to the element 7 are provided between the cylindrical portions of the element, no part of the element extending radially outside the inner bearing raceways, which ensures free passage of the element through the sector and the bearings. According to the embodiment shown, the mounting means comprise two recesses x, y (FIG. 3) on either side of the element 7, which recesses each have a radially directed supporting surface for the end of a fastening screw provided in a threaded bore in the sector. FIG. 1 shows a screw 14 and 15, respectively, tightened against one supporting surface on each side of the element 7, and FIG. 2 shows two screws 15, 16 on one side of the element. In order to eliminate play in the cog contact between the rack 2 and the cog-sector 3, the latter can be split in a plane 17 (FIG. 2) perpendicular to the axis 6, the parts of the sector being individually rotatable and tightenable in opposite directions against the cogs on the rack 2 with the aid of the screws with which the sector is fastened to the element 7. One screw is therewith arranged on either side of each sector part. It is possible to mount the sector resiliently by placing springs between the supporting surface and at least one screw of each sector part.

The element 7 is also provided with means for connecting it to a machine element which is to be rotated, for example a ball in a ball valve. In the embodiment shown, the element has a central bore 18 and a groove 19, in which a shaft end with a wedge or a similar device which is connected to or form a part of said machine element can be inserted. The element 7 can easily be designed in various ways to fit the connecting members of any machine element, and since the element 7 is easily exchangeable in the device according to the invention, the device can easily be adapted for co-operating with various machine elements by simply replacing the element 7.

FIG. 3 shows how the element 7 can be provided with means for sealing of the bearings of the element. A bevel 20 is made at either end of the element, so that the end portions outside of the bearing raceways for the rolling elements 9 have annular surface portions which are narrowing towards the centre of the element. These surface portions provide seats for sealing members 21 for the bearing. The sealing members may be O-rings of rubber which rings are expanded on the surface 20 and pressed against the end surfaces of the outer bearing races.

Also other embodiments of the invention are possible within the scope of the claims. For example, the rack may be actuated by other means than a screw-and-nut device, such as hydraulic, pneumatic, magnetic, electric or mechanical devices of various kinds. The cog-sector can be replaced by a complete cog-wheel. The rack may be replaced by a push-pull bar and the sector by a lever which is flexibly connected to the bar and arranged on the element 7 in the same manner as the sector. In order to fasten the cog-sector on the element 7, members of various kinds which are provided in the sector may be inserted in corresponding recesses in the element 7, or fastening can be arranged in other ways. The rolling bodies of the bearings may contact separate inner raceways arranged on the element 7. The bearings may also be sliding bearings. The sealing members 21 may be of another kind than O-rings, e.g. lip seals, and a special sealing ring which co-operates with the respective sealing member can be provided in the seat of the housing 1.

What is claimed is:

1. A device for performing a rotary motion comprising a first member rotatably mounted in a housing (1) or the like and detachably connected to a rotatable machine element, a coupling element (7) detachably inserted in a bore of said first member (3) and rotatably mounted in the housing on rolling bearing assemblies, said coupling element (7) having cylindrical portions (10,11) extending on opposite sides of said first member (3) of a diameter no greater than the diameter of said bore and defining inner raceways for the rolling elements of said rolling bearing assemblies, and means for detachably fastening said coupling element (7) to said first member (3) including means defining at least a pair of recesses (X,Y) on either side of said coupling element (7), each of said recesses having a radially directed supporting surface and screw fastener means (15,16) engaging in said recesses with said radially directed supporting surfaces, said recesses located between said cylindrical portions (10,11) and formed radially into said coupling element (7) such that said recesses are radially within said diameter of said cylindrical portions (10,11).

2. A device according to claim 1, wherein said coupling element (7) has annular surface portions (20) tapering towards the center of said coupling element (7) and axially outboard of said cylindrical portions (10,11), said surface portions constituting seats for sealing members (12) for said rolling bearing assemblies.

* * * * *